(12) United States Patent
Schweiss

(10) Patent No.: US 10,038,181 B2
(45) Date of Patent: Jul. 31, 2018

(54) ELECTRODE SUBSTRATE MADE OF CARBON FIBERS AND METHOD OF PRODUCING THE ELECTRODE SUBSTRATE

(71) Applicant: SGL CARBON SE, Wiesbaden (DE)

(72) Inventor: Ruediger-Bernd Schweiss, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 15/062,805

(22) Filed: Mar. 7, 2016

(65) Prior Publication Data

US 2016/0190547 A1 Jun. 30, 2016

Related U.S. Application Data

(63) Continuation of application No. PCT/EP2014/068148, filed on Aug. 27, 2014.

(30) Foreign Application Priority Data

Sep. 6, 2013 (DE) ........................ 10 2013 217 882

(51) Int. Cl.

| | | |
|---|---|---|
| *H01M 4/133* | (2010.01) | |
| *D21H 13/50* | (2006.01) | |
| *H01M 4/38* | (2006.01) | |
| *H01M 8/18* | (2006.01) | |
| *H01M 4/66* | (2006.01) | |
| *H01M 10/052* | (2010.01) | |
| *H01M 10/054* | (2010.01) | |
| *H01M 12/06* | (2006.01) | |
| *H01M 12/08* | (2006.01) | |
| *C25B 11/12* | (2006.01) | |
| *H01M 4/96* | (2006.01) | |
| *H01M 4/80* | (2006.01) | |
| *C01B 32/05* | (2017.01) | |
| *C01B 32/20* | (2017.01) | |
| *H01M 8/16* | (2006.01) | |
| *H01M 8/0234* | (2016.01) | |
| *H01M 4/04* | (2006.01) | |
| *H01M 4/62* | (2006.01) | |
| *H01M 4/86* | (2006.01) | |
| *H01M 8/0243* | (2016.01) | |

(52) U.S. Cl.
CPC ............. *H01M 4/133* (2013.01); *C01B 32/05* (2017.08); *C01B 32/20* (2017.08); *C25B 11/12* (2013.01); *D21H 13/50* (2013.01); *H01M 4/381* (2013.01); *H01M 4/382* (2013.01); *H01M 4/663* (2013.01); *H01M 4/665* (2013.01); *H01M 4/80* (2013.01); *H01M 4/96* (2013.01); *H01M 8/188* (2013.01); *H01M 10/052* (2013.01); *H01M 10/054* (2013.01); *H01M 12/06* (2013.01); *H01M 12/08* (2013.01); *H01M 12/085* (2013.01); *H01M 4/0416* (2013.01); *H01M 4/0471* (2013.01); *H01M 4/622* (2013.01); *H01M 4/623* (2013.01); *H01M 4/667* (2013.01); *H01M 4/668* (2013.01); *H01M 4/8668* (2013.01); *H01M 8/0234* (2013.01); *H01M 8/0243* (2013.01); *H01M 8/16* (2013.01); *Y02E 60/128* (2013.01); *Y02E 60/527* (2013.01)

(58) Field of Classification Search
CPC .......... H01M 4/133; H01M 4/80; H01M 4/96; C25B 11/12
See application file for complete search history.

(56) References Cited

U.S. PATENT DOCUMENTS

| | | | |
|---|---|---|---|
| 4,882,241 A | 11/1989 | Heinzel | |
| 2003/0194557 A1* | 10/2003 | Wilde | D21H 13/50 428/408 |
| 2008/0038589 A1 | 2/2008 | Nakamura et al. | |
| 2011/0020701 A1* | 1/2011 | Park | H01M 4/133 429/206 |
| 2011/0183180 A1* | 7/2011 | Yu | H01G 11/36 429/128 |
| 2013/0319870 A1* | 12/2013 | Chen | H01M 4/133 205/86 |

FOREIGN PATENT DOCUMENTS

| | | |
|---|---|---|
| EP | 0312875 A1 | 4/1989 |
| EP | 1788651 A1 | 5/2007 |
| JP | 2005302558 A | 10/2005 |

OTHER PUBLICATIONS

D.S. Aaron et al., "Dramatic performance gains in vanadium redox Flow batteries through modified cell architecture", Journal of Power Sources, vol. 206, 2012, 450-453.
M. Hagen et al., "Development and costs calculations of lithium-sulfur cells with high sulfur load and binder free electrodes", Journal of Power Sources, vol. 224, 2013, 260-268.

* cited by examiner

*Primary Examiner* — Stewart A Fraser
(74) *Attorney, Agent, or Firm* — Laurence A. Greenberg; Werner H. Stemer; Ralph E. Locher

(57) ABSTRACT

A porous electrode substrate has a form of a tape material and contains a structure made of carbon fibers and a carbon matrix. A specific surface area, porosity, and pore distribution are determined by the carbon matrix. The carbon matrix contains carbon particles including activated carbon with a high specific surface area and a carbonized or graphitized residue of a carbonizable or graphitizable binder.

9 Claims, No Drawings

ELECTRODE SUBSTRATE MADE OF CARBON FIBERS AND METHOD OF PRODUCING THE ELECTRODE SUBSTRATE

CROSS-REFERENCE TO RELATED APPLICATION

This is a continuation application, under 35 U.S.C. § 120, of copending international application No. PCT/EP2014/068148, filed Aug. 27, 2014, which designated the United States; this application also claims the priority, under 35 U.S.C. § 119, of German patent application No. DE 10 2013 217 882.4, filed Sep. 6, 2013; the prior applications are herewith incorporated by reference in their entirety.

BACKGROUND OF THE INVENTION

Field of the Invention

The invention relates to an electrode substrate made of carbon fibers—especially, for redox flow batteries, regenerative fuel cells, polymer electrolyte fuel cells, metal-air batteries, lithium sulfur batteries, or zinc-bromine batteries—as well as to methods for their production.

Redox flow batteries and regenerative (or reversible) fuel cells are electrochemical energy storage devices that feature aqueous or organic solutions of metal ions and transition metal ions and/or respective complexes such as, for example, from iron, cerium, chrome, zinc, titan, vanadium, or redox systems on the basis of solutions of halogens (for example, bromide and/or chloride) or polysulfides as active mass for charge storage. These are stored in external tanks and pumped through an electrochemical reactor containing two half-cells divided by an ion-conducting membrane or a micro-porous separator during battery operation.

Porous flow electrodes perfused by the solutions of the active materials are arranged in the half-cells.

During charging and/or discharging, the respective redox pairs in the half-cells are oxidized and/or reduced on porous flow electrodes (carbon felt or carbon foam, metal foams). Due to the external storage of the active masses and the energy conversion in a reactor (cell), independent dimensioning of energy and performance of the battery system becomes possible.

Similar to redox flow batteries, fuel cells convert externally supplied fuel, such as hydrogen or low alcohols/ethers, and an oxidation agent—usually oxygen or air—to electricity, reaction products, and excess heat by electrochemical reactions.

For fuel cells and redox flow batteries, several individual cells, due to the low cell potential, are usually combined into a cell stack in order to increase voltage and performance output. There exist, furthermore, hybrid forms, such as, for example, a vanadium-air fuel cell in which the negative electrode consists of a vanadium-saline solution in a porous flow electrode and the positive electrode (cathode) is configured analogously to a classical fuel cell cathode.

Metal-air batteries combine an anode made of an electropositive metal (lithium, zinc) with the redox partner, oxygen, electrochemically reacting on a cathode, in the form of a carbon-based or metal-based gas diffusion electrode, to give water or hydroxide ions. Gas diffusion electrodes are usually rendered water-repellent by impregnation with fluorine-polymers and to provide a three-phase boundary (solid electron conductor/liquid phase/gas phase) on which the electrochemical reaction may take place.

Metal sulfur batteries are secondary batteries combining lithium or sodium as the negative electrode, with the redox system sulfur/polysulfide as the positive electrode. Since the active material sulfur has little or no electrical conductivity, it is introduced into a porous, powdery carbon matrix (lithium-sulfur battery) and/or a carbon felt (sodium-sulfur battery).

With any electrode material, it is desirable that the electrode substrate may be processed as continuous roll material in order to achieve high production volumes. This allows the application of cost-effective procedures on an industrial scale, e.g., for depositing potentially required catalyst layers on the substrate, and for subsequent production steps such as, for instance, lamination on a current arrester. Furthermore, an electrode substrate as a continuous roll offers higher homogeneity and uniformity of the product, compared with electrode substrate produced in batches.

In addition to the requirements discussed above, the electrode material must be inert and corrosion resistant with regard to the electrolyte materials, fuels, oxidizing agents, and reaction-products and/or by-products. Moreover, the flexibility of the electrode material must be sufficient to allow processing from coil to coil as roll material.

The disadvantage of the usual electrode materials for redox flow batteries is their thickness of 2 to 5 mm, which leads to a relatively high electrical resistance, as well as to a significant hydrodynamic resistance when perfused. Furthermore, those materials cannot usually be sufficiently wetted for the electrolyte solutions and must be partially oxidized by thermal treatment before use.

A new approach for redox flow batteries is to configure the battery with a current arrester made of a graphite plate, with current channels combined with a thin electrode on a carbon fiber basis (D. S. Aaron et al., Journal of Power Sources, volume 206, 2012, 450-453). This concept allows a considerably higher power density due to the reduced ohmic resistors, compared to the traditional design.

For metal-air batteries, gas diffusion electrodes are usually produced by coating a carrier structure (e.g., PTFE or metallic gauze) with carbon particles.

Positive electrodes of lithium sulfur accumulators are usually configured as paste electrodes, for which a suspension of carbon and sulfur particles is coated onto a metal-based arrester foil.

SUMMARY OF THE INVENTION

It is, therefore, the purpose of the invention to find a cost-efficient and flexible method of production for a thin, fiber-based, and connected electrode structure, which may be used for redox flow batteries, regenerative fuel cells, metal air, metal sulfur batteries, or fuel cells, depending upon the embodiment.

The method is intended to optimize the electrode material during production by applying catalytically active substances (redox flow battery, metal air battery), inhibitors (redox flow battery), or functional carbon-based filler materials (redox flow battery, lithium sulfur battery), depending upon the respective application.

In addition, materials should be such as may be flexibly processed further, e.g., by lamination with a current arrester as a plate or film.

Catalytically active substances (e.g., Co, Ir, Pt, Bi, Mn, Te, In, Pd) accelerate the electrochemical reactions on the electrode (e.g., redox reactions of transition metal ions, metal ions, and the oxygen reduction of metal air batteries) and thus increase the battery performance.

A higher specific surface area of the electrode, caused by the filling material matrix, and/or heteroatom doping (oxygen, nitrogen) of the carbon structure has similarly positive effects upon the electrochemical kinetics.

Inhibitors (particles, salts, or oxides of Pb, Bi, Sn, Cd, Tl, In, Sb, Au) increase the load efficiency of redox flow batteries, since they obstruct parasitic reactions such as the formation of hydrogen in the electrolyte (see European patent EP 0312875 A1).

For optimum efficiency of a lithium sulfur battery, a certain pore structure and a defined pore space are required (Hagen et al., Journal of Power Sources, volume 224, 2013, 260-268). This may be custom-made during the process by selection of the filler material matrix (type, quantity).

The subject-matter of the invention is a porous electrode substrate in line form (roll material), containing a structure of carbon fibers and a carbon matrix which is generated by, for example, impregnating the line with a preferably water-based or alcoholic dispersion of carbon particles, binder substances, and doping agents (e.g., metal particles or metal oxide particles, pore-forming agents) and subsequent hardening and/or carbonization.

The specific surface area, porosity, and pore distribution are determined by the carbon matrix according to the invention, preferably containing the filling material type, the filling material content, and/or the temperature for thermal treatment.

The mass ratio of binder substances to carbon particles is preferably between 1:10 and 10:1.

Pore-forming agents are preferably selected from the group ammonium hydrogen carbonate, ammonium carbonate, lithium carbonate, ammonium oxalate, ammonium acetate, oxalic acid, azodicarbonamide, azoisobutyl nitrile, benzoyl peroxide, cellulose powder, micro-crystalline cellulose, sucrose, and starch flour.

Preferably, at least a portion of the interstices in the structure of carbon fibers or carbon precursor fibers and the carbon matrix is filled with an activated carbon with high specific surface area, as well as with a carbonized or graphitized residue of a carbonizable or graphitizable binder.

BET measurement is a term for a procedure for analyzing the size of surfaces, especially of porous solid bodies, by gas adsorption. It is a method from surface chemistry used to calculate the mass-related specific surface area from experimental data.

It is preferred that the mass relation between the carbonized or graphitized residue and the carbon particles, as well as the activated carbon with high specific surface area, should be between 1:10 and 10:1 and the carbonized or graphitized residue, together with the carbon particles and the activated carbon with high specific surface area, constitute a mass proportion between 25 and 75% on the electrode, that the substrate BET be 5 to 250 m$^2$/g preferably, in particular, 1 to 100 m$^2$/g that the porous electrode substrate be between 0.1 and 0.4 mm thick, and that the electrical resistance in z-direction be <25 mOhm/cm$^2$ preferably, <10 mOhm/cm$^2$.

It is particularly preferable to select the structure of carbon fibers from the group non-crimp fabric, paper, woven fabric and nonwoven. The thickness of the woven fabric or nonwoven is preferably between 0.1 and 0.6 mm.

It is particularly preferable that the carbon particles consist of acetylene soot, oil soot, gas soot, graphitized soot, ground carbon fibers, carbon nanotubes (CNT's), carbon nano-fibers, carbon aero gels, meso-porous carbon, fine-grain graphite, glassy carbon powder, expanded graphite, ground expanded graphite, graphite oxide, flake graphite, activated carbon, graphene, graphene oxide, N-doped CNT's, boron-doped CNT's, fullerenes, petcoke, acetylene coke, anthracite coke, carbonized meso-phase pitches, and/or doped diamond.

The carbonizable or graphitizable binder preferably consists of hard coal tar pitches, phenol resins, benzoxazine resins, epoxide resins, furan resins, furfuryl alcohols, vinyl ester resins and particularly preferred of materials that have heteroatoms in the carbon structure and may generate heteroatom-doped carbon during carbonization, such as melamine-formaldehyde resins (MF), urea-formaldehyde resins (UF), resorcinol formaldehyde (RF) resins, acrylonitrile butadiene rubber, cyanate-ester resins, bismaleimide resins, polyurethane resins, and/or polyacryle nitrile.

It is particularly preferred that the carbon proportion as carbon fibers, carbonized, or graphitized residue, as well as the carbon particles and the activated carbon, be at least 95% by weight and the heteroatom proportion at least 1% by weight.

Porosity is preferably between 15 and 97% by weight, expressed by the relation of the open volume to the sum of open volume, volume of carbon fibers, and the volume formed by all solid materials, containing carbonized or graphitized residue, as well as the carbon particles and activated carbon.

Porous carbon may preferably be generated with polyvinylidene fluoride (PVDF).

In addition, the porous electrode substrate was, preferably, impregnated with one or several impregnating agents and/or doped with one or several doping agents.

The electrode substrate is, preferably, also additionally coated with a layer consisting of completely or partially fluorinated polymer, as well as conductive particles.

Another subject matter of the invention is a method for producing a porous electrode substrate in line form (roll material), wherein a precursor structure is carbonized and the resulting structure of carbon fibers is impregnated and dried and/or hardened with a dispersion comprising carbon particles, a carbonizable binder and activated carbon, and carbonized in an inert gas atmosphere, preferably with an inert gas such as, for example, nitrogen or argon, in a continuous furnace at 800-3,000° C.—preferably at 900-2,000° C.

The precursor structure consists, preferably, of carbon fibers, fibers from the group of polyacrile nitrile, oxidized polyacryl nitrile (PANOX), Novoloid (phenole resin fibers), cellulose, cellulose acetate, lignine, polyaramide, polyimide, polyoxodiazole, polyvinyl alcohol, polyamide, or pitch fibers.

It is particularly preferred that the carbon fibers used are short cut fibers, stable fibers, or continuous filaments.

The carbon fiber proportion in the structure is preferably 10 to 90%—most preferably, 20 to 80%.

Impregnation takes place, preferably, with a water-based or alcoholic dispersion.

Preferably, the impregnating agent contains a hydrophobe polymer, and the share in the electrode substrate is between 2 and 40% by weight.

In another embodiment, the carbonized substrate is, preferably, impregnated with fluoride-dispersions (for example, PTFE, PVDF, ETFE, and/or PFA) or poly-siloxane dispersion.

It is furthermore preferred that impregnation take place with $H_2$ inhibitors, among them nanoparticles of Au, Bi, Pb, Sn, Sb, In(III) oxide, In(III) salts, Bi(III) oxide, Bi(III) salts, Bi(OH)$_3$, In(OH)$_3$, antimony(III) oxide, antimony (III) salts, lead and lead salts, lead acetate, lead sulfate, tin(II) oxide, and Mo(II) salts.

Impregnation may be effected, preferably, by evaporation deposition or plasma deposition (PVD) and/or by galvanic or current less deposition of Au, Sn, Pb, Bi, and/or Sb.

Further preferred is doping with metals and/or metal oxides, among them manganese (III) salts, manganocene, cobaltocene, manganese(III, IV) oxides, nano-scale bismuth oxide(Bi$_2$O$_3$), ruthenium salts/ruthenium(II) oxide, RuO$_2$, iridium(III) salts, iridium oxide, metal particles and metal nanoparticles—preferably, in particular, Au, Sn, Pb, Bi, Ru, Ag, Rh, In, Sb, Ir, and/or Pd, polyoxometalate (POM), co-porphyrine, iridium oxide, Raney nickel, boron trioxide, boron acid, borax, boron acid ester, titanium diboride, sol-gel dispersions on the basis of alkoxides from the group Mn, Bi, Co, Ti and B, molybdenum disulphide, and Mo(II) salts.

Doping takes place, preferably, by evaporation deposition or plasma deposition (PVD) or galvanic and/or current less deposition of metals and/or metal oxides, such as Co, IR, manganese oxide and/or Au, Bi, Sn, Pb, In, Sb.

The impregnating dispersion preferably contains one or more dispersion agents selected from lignine sulfonates, naphtaline sulfonate condensates, polyalkylphenyl ether, polyethylene oxide polypropylene oxide copolymers, polyacrylate and polyvinyl alcohols, as well as particularly preferred dispersion agents containing N such as polyvinyl pyrrolidone, polyethylenimine, polyaminobenzol sulfonic acid, polybenzyl viologenes, or polydiallyldimethyl ammonium chloride.

Hardening agents used are, preferably, hexamethylene tetramine, ethylenediamine, glutardialdehyde, paraformaldehyde, or terephtaldehyde.

In a preferred embodiment, several impregnated layers of the electrode substrate are placed one upon another and hardened at >120° C. Following that, carbonization at 900 to 1,800° C. is particularly preferred. Optionally, surface oxidation at, for example, 450° C. for a maximum period of 15 minutes may occur in air and/or under air supply.

In another preferred embodiment, the surface oxidation is effected chemically, for example with nitric acid, perchloric acid, periodate, permanganate, Cer(IV) sulfate, or hydrogen peroxide.

The substrate is, preferably, oxidated thermally after the carbonization step—for example, with air and/or oxygen and, for example, at a temperature of >250° C. or in a wet-chemical process.

It is particularly preferable that the porous electrode substrate be used in redox flow batteries and/or lithium sulfur batteries and/or sodium sulfur batteries and/or zinc bromine batteries and/or zinc air batteries and/or vanadium air batteries and/or vanadium air fuel cells and/or polymer electrolyte fuel cells and/or microbial fuel cells and/or H$_2$/Cl$_2$ fuel cells and/or H$_2$/Br$_2$ fuel cells and/or PEM electrolyzers.

For redox flow batteries, the use of a laminate with a current collector (e.g., graphite plates or graphite compound bi-polar plates) or arrester foil (e.g., Ti, Ni, or graphite film) is preferable. Further preferred are simple and/or multiple material layers or the grouting before carbonization for multi-layer embodiments.

For lithium sulfur batteries and sodium sulfur batteries, infiltration preferably occurs with sulfur, thiosulfate, xanthogenates, and/or polysulfides.

For zinc air batteries, vanadium air batteries, and fuel cells, hydrophobization preferably takes place with fluoride polymers or siloxane polymers.

Since the specific surface area, porosity, and pore distribution may be determined by the carbon matrix (filler matrix) and/or the temperature during thermal treatment, an adaptation to the various operational areas is, surprisingly, possible.

For example, for redox flow batteries, a high BET, a higher catalytic activity of heteroatoms in the C grid, and doping with inorganic oxides and/or metal particles is desired—for lithium sulfur batteries, a mid-level BET.

DETAILED DESCRIPTION OF THE INVENTION

The following examples explain the invention.

Example 1

A line of carbon fiber raw paper (square measures 20 g/m$^2$), produced in wet fluid processing with short cut carbon fibers (3-12 mm), is impregnated by a foulard in an aqueous dispersion consisting of 50 kg water, 0.75 kg polyvinyl pyrrolidone, 6.75 kg acetylene soot, 0.75 kg activated carbon (BET>1,000 m$^2$/g), 0.75 kg 2-aminopropanole, 0.1 kg ammonium hydrogen carbonate, and 18.75 kg resorcinol formaldehyde resin dispersion and dried and/or hardened in a continuous furnace. Carbonization subsequently takes place under inert gas atmosphere in a continuous furnace at 1,400° C.

Example 2

A roll of carbon fiber fleece (40 g/m$^2$), produced by carbonizing a water-jet hardened fleece on the basis of polyacryl nitrile or oxidized polyacryl nitrile staple fibers (20 to 80 mm), is impregnated on a foulard in an aqueous dispersion consisting of 56 kg water, 0.95 kg polyvinyl alcohol, 7.5 kg acetylene soot (BET surface 60 m$^2$/g), and 20.65 kg melamine formaldehyde resin (40%) and dried and/or hardened in a continuous furnace. Carbonization subsequently takes place under inert gas atmosphere in a continuous furnace at 1,400° C.

The following table shows the material parameters for examples 1 and 2, with a reference sample for comparison. A 2-point measurement at a load of 100 N/cm$^2$ was conducted to measure the resistance.

|  | Thickness (μm) | Porosity (%) | Resistance (mOhm/cm$^2$) | Element analysis C O | N | BET (m$^2$/g) |
|---|---|---|---|---|---|---|
| Reference GDL 10AA | 370 | 87.8 | 4.2 | 98.5 0.1 | 0.3 | 0.8 |
| Example 1 | 210 | 91.2 | 6.2 | 97.8 0.6 | 0.9 | 70 |
| Example 2 | 380 | 88.7 | 9.8 | 97.5 0.1 | 1.4 | 34 |

In order to assess electrochemical activity, cyclic voltammetry measurements of untreated electrode materials were conducted in 1 mM Fe(CN)$_6^{3-/4-}$ in 0.1 M potassium chloride solution.

An ideally reversible redox pair results in a separation of 60 mV between the oxidation ($E_p^{ox}$) and reduction peak ($E_p^{red}$) (A. J. Bard, L. M. Faulkner (eds.), Electrochemical Methods: Fundamentals and Applications, Wiley, 2001). The considerably smaller peak separations for the materials in examples 1 and 2, compared to the reference material, confirm the significantly improved electrochemical kinetics of the materials from embodiment examples 1 and 2.

|  | $E_p^{ox} - E_p^{red}$ |
| --- | --- |
| Reference GDL 10AA | 322 mV |
| Example 1 | 70 mV |
| Example 2 | 100 mV |

The invention claimed is:

1. A porous electrode substrate formed as a tape material, comprising:
   a structure of carbon fibers; and
   a carbon matrix, wherein the carbon matrix comprises carbon particles including activated carbon with a specific surface area of more than 1000 m²/g and a carbonized or graphitized residue of a carbonizable or graphitizable binder, and that at least a part of interstices in the structure of carbon fibers and the carbon matrix is filled with the activated carbon, as well as with the carbonized or graphitized residue of a carbonizable or graphitizable binder, further wherein specific surface area, porosity and pore distribution are determined by the carbon matrix.

2. The porous electrode substrate according to claim 1, wherein:
   a mass ratio between said carbonized or graphitized residue and said carbon particles is between 1:10 and 10:1, including said activated carbon having a specific surface area greater than 1000 m²/g; and
   said carbonized or graphitized residue, together with said carbon particles, constitute a mass proportion between 25 and 75% of the porous electrode substrate, a substrate BET is 5 to 250 m²/g, the porous electrode substrate has a thickness between 0.1 and 0.4 mm and an electrical resistance in a z-direction is below 25 mOhm/cm².

3. The porous electrode substrate according to claim 1, wherein said structure of carbon fibers is selected from the group consisting of non-crimp fabrics, paper, woven fabrics and nonwovens.

4. The porous electrode substrate according to claim 1, wherein said carbon particles contain at least one of acetylene black, furnace black, gas black, graphitized carbon black, milled carbon fibers, carbon nanotubes (CNT's), carbon nano-fibers, carbon aerogels, meso-porous carbon, fine-grain graphite, glassy carbon powder, expanded graphite, ground expanded graphite, graphite oxide, flake graphite, activated carbon, graphene, graphene oxide, N-doped CNT's, boron-doped CNT's, fullerenes, petcoke, acetylene coke, anthracite coke, carbonized meso-phase pitches, or doped diamond.

5. The porous electrode substrate according to claim 1, wherein said carbonizable or graphitizable binder contains at least one of coal tar pitches, phenolic resins, benzoxazine resins, epoxide resins, furane resins, furfuryl alcohols, vinyl ester resins, melamine-formaldehyde resins (MF), urea-formaldehyde resins (UF), resorcinol formaldehyde (RF) resins, acrylonitrile butadiene rubber, cyanate-ester resins, bismaleimide resins, polyurethane resins, or polyacrylo nitrile.

6. The porous electrode substrate according to claim 1, wherein a carbon proportion in a form of said carbon fibers, said carbonized or graphitized residue and said carbon particles including said activated carbon, is at least 95% by weight and a heteroatom proportion is at least 1% by weight.

7. The porous electrode substrate according to claim 1, wherein the porosity is between 15 and 97% by weight, expressed as a proportion of an open volume to a sum of open volume, volume of carbon fibers, and a volume formed by all solid materials, containing said carbonized or graphitized residue and said carbon particles including said activated carbon.

8. The porous electrode substrate according to claim 1, wherein the porous electrode substrate is at least one of impregnated with at least one impregnation agent or doped with at least one doping agent.

9. An apparatus selected from the group consisting of redox flow batteries, lithium sulfur batteries, sodium sulfur batteries, zinc bromine batteries, zinc air batteries, vanadium air batteries, fuel cells, microbial fuel cells, $H_2/Cl_2$ fuel cells, $H_2/Br_2$ fuel cells, and PEM electrolyzers, the apparatus comprising:
   a porous electrode substrate formed as a tape material, said porous electrode containing a structure of carbon fibers and a carbon matrix, wherein the carbon matrix comprises carbon particles including activated carbon with a specific surface area of more than 1000 m²/g and a carbonized or graphitized residue of a carbonizable or graphitizable binder, and that at least a part of interstices in the structure of carbon fibers and the carbon matrix is filled with the activated carbon, as well as with the carbonized or graphitized residue of a carbonizable or graphitizable binder, further wherein specific surface area, porosity and pore distribution are determined by the carbon matrix.

* * * * *